Figure 1:
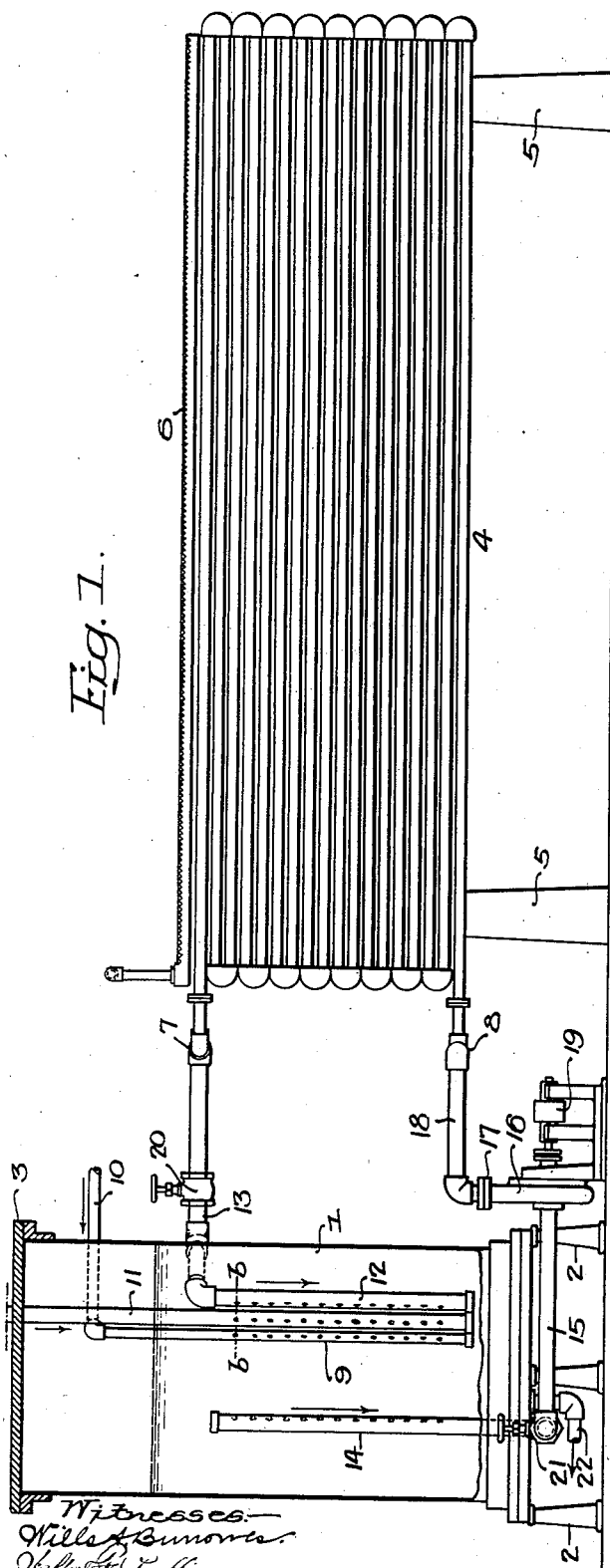

S. H. PETERSEN.
ABSORPTION MECHANISM FOR REFRIGERATING APPARATUS.
APPLICATION FILED APR. 7, 1913.

1,070,911.

Patented Aug. 19, 1913.

2 SHEETS—SHEET 1.

Inventor
Samuel H. Petersen,
by his Attorneys
Howson & Howson

S. H. PETERSEN.
ABSORPTION MECHANISM FOR REFRIGERATING APPARATUS.
APPLICATION FILED APR. 7, 1913.

1,070,911.

Patented Aug. 19, 1913.

2 SHEETS—SHEET 2.

Witnesses—

Inventor—
Samuel H. Petersen.
by his Attorneys.—
Howson + Howson

UNITED STATES PATENT OFFICE.

SAMUEL H. PETERSEN, OF PHILADELPHIA, PENNSYLVANIA.

ABSORPTION MECHANISM FOR REFRIGERATING APPARATUS.

1,070,911.  Specification of Letters Patent.  Patented Aug. 19, 1913.

Application filed April 7, 1913. Serial No. 759,431.

*To all whom it may concern:*

Be it known that I, SAMUEL H. PETERSEN, a citizen of the United States, residing in Philadelphia, Pennsylvania, have invented certain Improvements in Absorption Mechanism for Refrigerating Apparatus, of which the following is a specification.

My invention relates to refrigeration and is particularly adapted for use in the absorption system of refrigeration and where ammonia gas is separated from aqua ammonia by means of a still or generator and the ammonia gas is carried off under pressure and condensed for refrigerating purposes.

My invention consists primarily of an improved absorbing mechanism whereby the weak aqua ammonia which is discharged from the still is brought in contact with the ammonia gas after the latter has performed its function of refrigeration and on its return from the freezing coils.

Heretofore it was the general practice, in absorbers in refrigeration plants of the above described type, to provide cooling means for the aqua ammonia within the absorber tank or receptacle, said cooling means consisting of a coil or series of coils of pipe which were located within the tank of the absorber, and to cause water to circulate through these pipes or coils in order to keep the temperature of the aqua ammonia at a low degree, as it is well known that when the ammonia gas comes in contact with the weak aqua ammonia heat is produced by the absorption of the ammonia gas. However, in order to provide sufficient cooling surface the cooling coils had to be large and were cumbersome and inconvenient to repair or remove from the absorber tanks. Also, the water coils while in the absorber tank were not visible and they would often leak and allow the water to combine with the aqua ammonia thereby greatly reducing the efficiency of the mechanism.

One object of my invention is to provide a continuous cooling means for the aqua ammonia which will be of such a construction that it may easily be repaired or replaced and in which any defects may be readily detected.

Another object of my invention is to provide a more efficient cooling means for aqua ammonia than has heretofore been produced.

Another object is to provide an absorber in which the incoming ammonia gas will be more quickly absorbed by the aqua ammonia within the absorber tank or receptacle than has heretofore been accomplished.

A still further object is to reduce the cost of absorbers of the above described type and render them durable.

Figure 2:
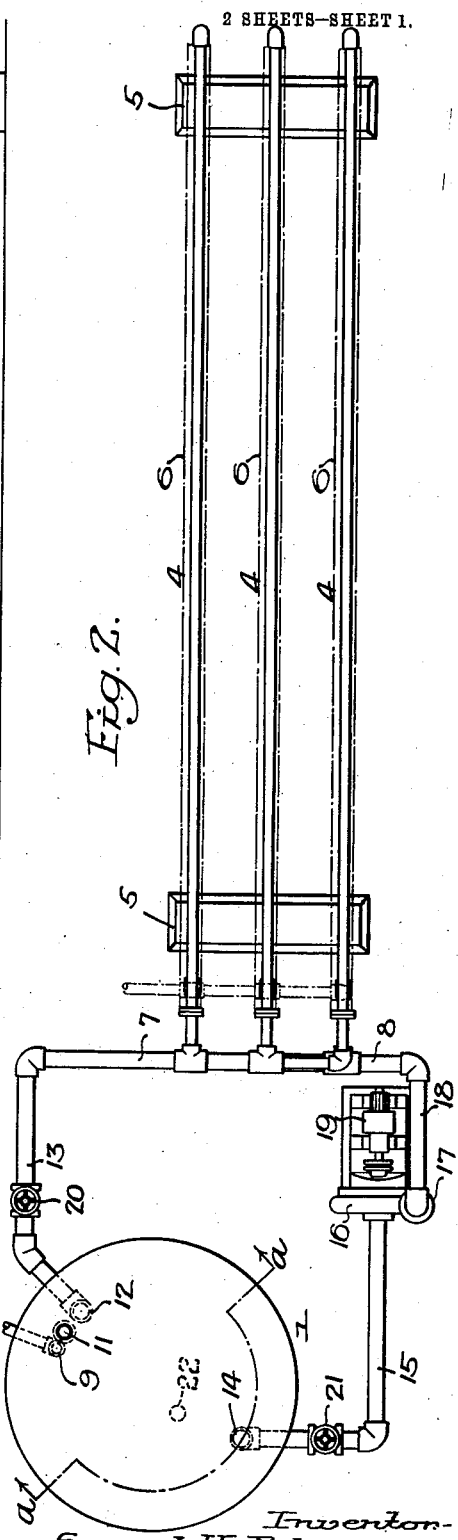
Figure 3:
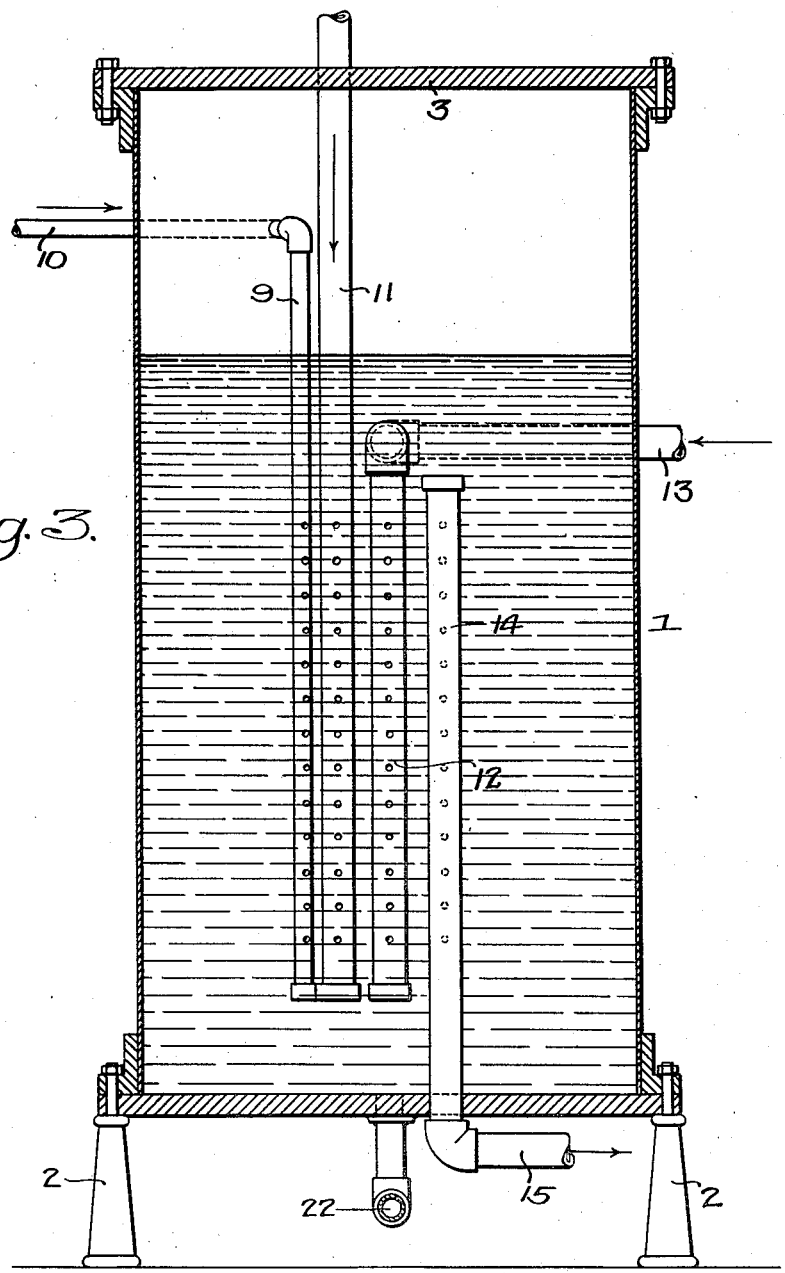
Figure 4:
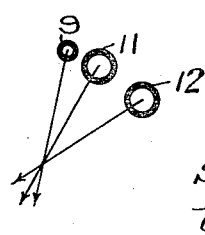

These objects, and other advantages which will be described hereinafter, I attach in the following manner reference being had to the accompanying drawings in which, Figure 1, is a front elevation of my invention showing the absorber tank partly in section; Fig. 2, is a plan view of the mechanism shown in Fig. 1; Fig. 3, is an enlarged section taken on the line $a$—$a$ Fig. 2; and Fig. 4, is an enlarged section taken on the line $b$—$b$ Fig. 1 through certain pipes which I employ.

Referring to the drawings, 1 is the absorber tank or container which is supported in the present instance in a vertical position on standards 2, and is provided at the top by a covering plate 3. Pipe coils 4 are supported on standards 5 and may be of the well known circulating type. Water spray troughs 6 are mounted above the coils and in such a position that when the troughs are supplied with water the latter will flow over the edges of the trough and will fall on the pipe coils 4 and thereby tend to keep them cool. In the accompanying drawings I have shown three coils of pipes, and the upper end of each coil extends within a transverse pipe or header 7 while the lower ends of each coil extend within another transverse pipe or header 8. It will be understood that one or any number of coils 4 may be used.

The container 1 is partly filled with aqua ammonia which is supplied by means of a perforated pipe 9 mounted within the container 1 and which connects with a pipe 10 which conveys weak ammonia liquid from the still or generator after it has been cooled by passing through weak liquor coolers of any ordinary type. The ammonia gas passes from the freezing coils through the pipe 11 into the container 1 and the pipe 11 is perforated to allow the gas to mix with and to be absorbed by the aqua ammonia within the container. A perforated pipe 12 is mounted within the container 1 and is connected by means of a pipe 13 to the header 7. Another perforated pipe 14 is mounted within the container 1 and is connected by means of a pipe 15 to a circulating pump 16; the latter having its discharge outlet 17 connected to a pipe 18 which communicates with a lower header 8. The pump 16 may be actuated by any means but, as illustrated, is driven by means of an electric motor which is diagrammatically shown at 19. The pipe 13 is provided with a valve 20 and the pipe 15 is provided with a valve 21. A take-off pipe 22 passes through the bottom of the container 1 and serves to convey the strong aqua ammonia to the ammonia pump and thence to the still or generator in the usual manner.

I preferably arrange the perforations in each of the pipes 9, 11 and 12 in such a manner as to cause a rapid absorption of the incoming gas through the pipe 11 by the incoming weak aqua ammonia through the pipe 10; the ejection of the aqua ammonia through the perforations of the pipe 12 also tending to accelerate the absorption in a manner which will be more fully described hereinafter. Referring to Fig. 4 it will be noticed, that as indicated by the arrows the direction of ejection of the contents of each of the pipes is such that they will intersect each other.

The operation is as follows: The ammonia gas passes through the pipe 11 and through the perforations in the said pipe into the aqua ammonia within the container 1 and the weak aqua ammonia, as previously described, passes through the pipe 10 and the perforations in the latter also into the container 1. The incoming aqua ammonia and the discharge of the latter through the pipe 22 may be regulated in any well known manner so as to keep a predetermined volume of aqua ammonia within the said container. The action of the pump 16 serves to circulate the aqua ammonia, which passes downwardly through the pipe 14, through the pipe 18, header 8, coils 4, header 7, pipe 13, and the perforated pipe 12 from which it is discharged through the perforations into the container 1 again. It will thus be seen that there will be a continuous circulation of the aqua ammonia from the container 1 through the coils 4. During the circulation of the aqua ammonia, water is admitted to the troughs 6 and this rapidly flows over the outside of the pipes of the coils. The latter will thus be kept cool and will necessarily cool the aqua ammonia as the latter passes therethrough. I preferably actuate the pump 16 so that it will circulate a greater volume of the aqua ammonia through the coils 4 in a given time than is drawn off through the pipe 22 in an equal time so that aqua ammonia which passes through the pipe 22 will have been circulated several times through the coils 4. By this arrangement the temperature and consequently the internal pressure of the container will be kept low which is very desirable in apparatus of this nature. Also, as the coils are directly exposed to the atmosphere and water-cooled in the manner above described, the pipes constituting the coil are kept very cold and the aqua ammonia which passes from the pipe 22 is consequently much colder than has heretofore been the case with cooling coils mounted within the absorber tank.

In a machine constructed in accordance with my invention the pipes of the cooling coil may be readily cleaned without disturbing the absorber or the contents thereof. Also, the container may be of a simple construction and practically only contains the four perforated pipes as shown, which are readily accessible if it is desired for any purpose to remove or repair them. If they should become cracked or otherwise injured owing to defects in or wear of material it would not interfere with the efficiency of the absorber.

I claim:—

1. The combination, in absorbing mechanism for refrigerating apparatus, of a container for the absorbing liquid; a coil located outside of the container and having its ends opening into the latter; means for circulating said liquid through the coil; and means for cooling the coil.

2. The combination, in absorbing mechanism for refrigerating apparatus, of a container for the absorbing liquid; a discharge conduit entering said container; a cooling conduit connected to said container; and means for repeatedly circulating liquid from the container through said conduit before it passes out of said discharge conduit.

3. The combination, in absorbing mechanism for refrigerating apparatus, of a container for the absorbing liquid and provided with a liquid inlet and an outlet; a coil located outside of the said container and having its ends opening therein; a conduit for delivering gas to the container; with means for spraying cold water over said coil.

4. The combination, in absorbing mechanism for refrigerating apparatus, of a container for the absorbing liquid; a gas inlet in the container for discharging gas into the liquid therein; liquid inlet and discharge conduits respectively connected to the container; a cooling coil having its ends opening into the container; means for circulating the liquid through the said coil; and means for cooling the coil.

5. The combination, in absorbing mechanism for refrigerating apparatus having a container for holding the absorbing liquid and a gas inlet in the container, of a conduit leading from the interior and outside of the container and having its other end also leading therein; means for circulating the absorbing liquid from the container through the said conduit; and means for cooling the conduit to cool the liquid passing therethrough.

6. The combination, in absorbing mechanism for refrigerating apparatus, of a container for the absorbing liquid; a gas inlet for the container having perforations below the level of the liquid in the container; a liquid inlet conduit within the said container and having perforations below said liquid level within the container; a coil outside of the container; means for cooling said coil; an outlet conduit for the container leading to one end of said coil; with a second liquid inlet conduit within the said container also having perforations below the level of the liquid and connected to the other end of the coil, said perforated inlets being disposed to eject their contents in lines intersecting each other within the container.

7. The combination, in absorbing mechanism for refrigerating apparatus having a container for holding the absorbing liquid and a gas inlet in the container, of a coil located outside of said container; a liquid take-off pipe leading from the interior of the said container to the coil; and means for cooling the said coil.

8. The combination, in absorbing mechanism for refrigerating apparatus having a container for holding absorbing liquid and a gas inlet in the container, of a cooling coil; a liquid take-off pipe leading from the interior of the said container to one end of the said coil; a liquid-return pipe leading from the other end of the coil to the interior of the said container; means for circulating the liquid between the interiors of the container and the said coil; and means for cooling the said coil.

9. The combination, in absorbing mechanism for refrigerating apparatus having a container for holding absorbing liquid and a gas inlet in the container, of a cooling coil; a liquid take-off pipe leading from the interior of the said container to one portion of the said coil; a liquid return pipe leading from another portion of the coil to the interior of the said container; means for circulating the liquid between the interiors of the container and the said coil; and means for distributing water over said coil.

10. The combination, in absorbing mechanism for refrigerating apparatus having a container for holding absorbing liquid and a gas inlet in the container, of a cooling coil; a liquid take-off pipe leading from the interior of the said container to one end of the said coil; a liquid return pipe leading from the other end of the coil to the interior of the said container; means for circulating the liquid between the interiors of the container and the said coil; and a water trough located above said coil and adapted to distribute water over the said coil to cool the liquid as it passes through the latter.

11. The combination, in absorbing mechanism for refrigerating apparatus having a container for holding absorbing liquid and a gas inlet in the container, of a cooling coil; a liquid take-off pipe leading from the interior of the said container to one end of the said coil; a liquid return pipe leading from the other end of the coil to the interior of the said container; means for cooling the said coil; and a pump for circulating the liquid between the interiors of the said container and of the coil.

12. The combination, in absorbing mechanism for refrigerating apparatus, of a container for holding the absorbing liquid; a gas inlet for the container and having perforations below the surface level of the liquid in the container; a liquid inlet within the said container and having perforations below the surface level of the liquid within the container; a discharge outlet for the container; a cooling coil; a circulating pump; a second outlet for the container and leading to the circulating pump; a pipe leading from the circulating pump to one end of said coil; a second liquid inlet within the said container, said second inlet having perforations below the surface level of the liquid within the container and being connected to the other end of said coil; and means for cooling said coil.

13. The combination, in absorbing mechanism for refrigerating apparatus, of a container for holding the absorbing liquid; a gas inlet for the container and having perforations below the surface level of the liquid in the container; a liquid inlet within the said container and having perforations below the surface level of the liquid within the container; a discharge outlet for the container; a cooling coil; a circulating pump; a second outlet for the container and leading to the circulating pump; a pipe leading from the circulation pump to one end of said coil; a second liquid inlet within the said container, said second inlet having perforations below the surface level of the liquid within the container and connected to the other end of said coil; and means for cooling said coil; said perforated inlets being so disposed as to eject their contents at intersecting angles to each other.

14. The combination, in absorbing mechanism for refrigerating apparatus, of a container for holding the absorbing liquid; a gas inlet for the container and having perforations below the surface level of the liquid in the container; a liquid inlet within the said container and having perforations below the surface level of the liquid within the container; a discharge outlet for the container; a cooling coil; a circulating pump; a second discharge outlet for the container and leading to the circulating pump; a pipe leading from the circulating pump to one end of said coil; a second liquid inlet within the said container, said second inlet having perforations below the surface level of the container and being connected to the other end of said coil; and means for cooling said coil.

In testimony whereof, I have signed my name to this specification, in the presence of two subscribing witnesses.

SAMUEL H. PETERSEN.

Witnesses:
 AUGUSTUS B. COPPES,
 JOS. H. KLEIN.